United States Patent Office 3,458,478
Patented July 29, 1969

3,458,478
METHOD FOR PREPARING POLYAMIDES FROM N-3-OXOHYDROCARBON SUBSTITUTED ACRYLAMIDES
Lester E. Coleman, Cleveland, Ohio, assignor to The Lubrizol Corporation, Wickliffe, Ohio, a corporation of Ohio
No Drawing. Continuation-in-part of application Ser. No. 553,647, May 31, 1966. This application Feb. 15, 1967, Ser. No. 616,182
Int. Cl. C08g 20/08, 20/20
U.S. Cl. 260—63       2 Claims

ABSTRACT OF THE DISCLOSURE

Polyamides containing oxo groups and having molecular weights of about 1,000–20,000 may be prepared either (1) by anionic polymerization of an N-3-oxohydrocarbon-substituted acrylamide (which produces a polyamide containing "nylon-5" and "nylon-7" units) or (2) by preparation of an enamine from an N-3-oxohydrocarbon-substituted amide or a 3-oxoalkyl ester, addition of the enamine to an acrylate or acrylonitrile, hydrolysis (in 2 steps) and self-condensation (which produces a "nylon-7" polymer). Copolymers containing polyamide units are also obtainable. The polyamides are useful for forming films, fibers and molded articles, for finishing textiles and paper and in adhesives.

RELATED APPLICATIONS

This application is a continuation-in-part of copending application Ser. No. 553,647, filed May 31, 1966, now abandoned. Said application is a continuation-in-part of Ser. No. 401,632, filed Oct. 5, 1964, now abandoned, which is a division of Ser. No. 326,394, filed Nov. 27, 1963, now U.S. Patent 3,277,056, which in turn is a continuation-in-part of Ser. No. 148,712, filed Oct. 30, 1961, now abandoned.

THE INVENTION

This invention relates to new polymeric compositions of matter and methods for their preparation. More particularly, it relates to polyamide compositions comprising repeating units represented by at least one of the formulas (A) 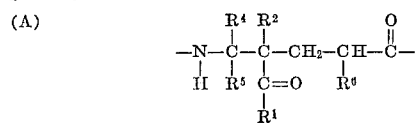

and (B) 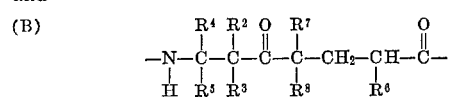

wherein each of $R^1$, $R^2$, $R^3$, $R^4$, $R^5$, $R^7$, and $R^8$ is individually hydrogen or a hydrocarbon radical and $R^6$ is hydrogen or a lower alkyl radical.

As used in the present specification, the term "hydrocarbon radical" includes aliphatic, cycloaliphatic and aromatic hydrocarbon radicals and derived radicals containing substituents such as halogen, ether, ester, nitro and the like so long as these substituents are not present in proportions sufficiently large to alter significantly the hydrocarbon character of the radical. The upper limit with respect to the proportion of such substituents is about 70% based on the weight of the hydrocarbon portion of the radical. Thus, the radicals may be, for example, methyl, ethyl, n-butyl, sec-butyl, n-decyl, cyclopentyl, cyclohexyl, phenyl, benzyl, tolyl, 2-chloro-1-butyl p-nitrophenyl, o-chlorophenyl and the like. The term "lower alkyl radical" is defined as an alkyl radical containing no more than 10 carbon atoms. As applied to the radical $R^6$, the lower alkyl radical is preferably methyl.

In a preferred embodiment of this invention, $R^{1-5}$, $R^7$ and $R^8$ are hydrogen or lower alkyl radicals and $R^6$ is hydrogen. In an especially preferred embodiment, $R^1$, $R^4$, and $R^5$ are methyl and the remaining radicals are hydrogen. The polymeric units then have the following structures.

($A^1$) 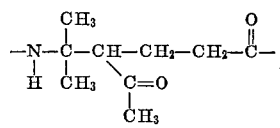

($B^1$) 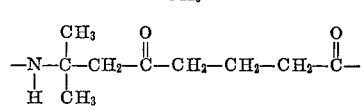

It will be appreciated that the above structures represent polyamides which may be denoted as "nylon-5" and "nylon-7," since they contain 5- and 7-carbon chains respectively. These terms will be used hereinafter to denote the respective moieties exemplified above.

As used in this application, the term "polymer" includes homopolymers, copolymers, terpolymers and other interpolymers with a wide variety of other monomers. For the most part, these other monomers are polymerizible vinyl compounds. They may include, for example, (1) esters of unsaturated acids, (2) vinyl cyclic compounds, (3) unsaturated ketones, (4) unsaturated amides, (5) unsaturated aliphatic hydrocarbons, and (6) unsaturated nitriles.

Specific illustrations of such compounds are:

(1) The esters of saturated alcohols such as methyl, ethyl, propyl, isopropyl, butyl, isobutyl, sec-butyl, tert-butyl, 2-ethylhexyl, cyclohexyl, behenyl, etc., with unsaturated aliphatic monobasic and polybasic acids such as acrylic, alpha-substituted acrylic (including alkylacrylic, e.g., methacrylic, ethylacrylic, propylacrylic, etc., and arylacrylic such as phenylacrylic, etc.), crotonic, oleic, linoleic, linolenic, and the like. The alkyl acrylates and methacrylates in which the alkyl radical contains from 1 to about 30 carbon atoms are especially useful because of their reactivity in interpolymerization.

(2) Vinyl cyclic compounds including (a) monovinyl aromatic hydrocarbon, e.g., styrene, o-, m-, p-chlorostyrenes, -bromostyrenes, -fluorostyrenes, -methylstyrenes, -ethylstyrene, -cyanostyrenes, di-, tri-, and tetra-, etc., -chlorostyrenes, -bromostyrenes, -fluorostyrenes, -methylstyrenes, -ethylstyrenes, -cyanostyrenes, vinylnaphthalene, vinylcyclohexane, vinylfuran, vinylpyridine, vinylbenzofuran, divinylbenzene, trivinylbenzene, allylbenzene, N-vinylcarbazole, n-vinylpyrrolidone, N-vinyloxazolidone, etc.

(3) Unsaturated ketones, e.g., methyl vinyl ketone, ethyl vinyl ketone, etc.

(4) Unsaturated amides, such as acrylamide, N-methylacrylamide, N-phenylacrylamide, N-allylacrylamide, N-methylolacrylamide, N-allylcaprolactam, etc.

(5) Unsaturated aliphatic hydrocarbons, for instance, ethylene, propylene, butenes, butadiene, isoprene, 2-chlorobutadiene, etc.

(6) Unsaturated nitriles, e.g., acrylonitrile, methacrylonitrile and other substituted acrylonitriles.

Also suitable for forming interpolymers are other polyamide precursors such as epsilon-caprolactam and the like.

The polymeric compositions of this invention may be prepared by a number of methods. A preferred method comprises the reaction of an N-3-oxohydrocarbon-substituted acrylamide with an anionic catalyst. The preparation of suitable N-3-oxohydrocarbon-substituted acrylamides is disclosed in U.S. Patent 3,277,056 and in co-pending application Ser. No. 582,501, filed Sept. 28, 1966. These compounds are in general represented by the formula

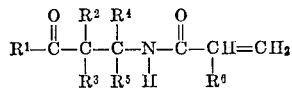

wherein $R^{1-6}$ are as previously described. It will be readily appreciated that the nylon-5 structure is only possible when $R^3$ is hydrogen, while the nylon-7 structure is only possible when $R^1$ is an alkyl radical containing at least one hydrogen atom. Thus, $R^1$ is preferably equivalent to

wherein $R^7$ and $R^8$ are as previously defined. When $R^3$ is hydrogen and $R^1$ is an alkyl radical containing at least one hydrogen atom, the polymers of this invention will often be "interpolymers" containing both nylon-5 and nylon-7 units.

For the purpose of the remainder of this application, it will be assumed that the structure of the polymers is such as would be expected if they were obtained by anionic polymerization of N - (1,1-dimethyl-3-oxobutyl)-acrylamide, hereinafter referred to as diacetone acrylamide. However, it should be understood that the other polymers of this invention may be substituted therefor.

In general, the polymers of this invention are prepared by dissolving diacetone acrylamide in a suitable solvent and adding the anionic catalyst thereto. The solvent should be one which is inert to the catalyst being used and may be, for example, an aromatic or aliphatic hydrocarbon or, preferably, an ether or a low molecular weight amide such as dimethylformamide. Typical anionic catalysts include butyllithium, fluorenyllithium, naphthylsodium, metallic sodium, Grignard reagents such as phenylmagnesium bromide, sodium alkoxides, trialkylaluminum-titanium halide complexes and other Ziegler-type catalyst, and the like. The reaction is ordinarily carried out at room temperature, and temperatures as high as about 80–100° C. may be used. An inert gas such as nitrogen or argon is preferably employed to protect the reaction mixture from oxidation by air. It is frequently desirable to add a free radical inhibitor, preferably N-phenyl-2-naphthylamine, to the reaction mixture to suppress polymerization of the diacetone acrylamide through the vinyl group, which may otherwise occur to some extent.

When the polymerization reaction is complete, the catalyst is normally "killed" by the addition of water or acid and the polymer is isolated. In general, the solubility of the polymer in various solvents will depend upon its molecular weight; low molecular weight polymers are soluble in such inert solvents as hexane, heptane, textile spirits, benzene and the like, while polymers of higher molecular weight are insoluble therein and are only soluble in polar organic solvents such as methanol, ethanol, acetone and the like. By the method described above, polymers with molecular weights as low as about 1000 and as high as about 20,000 may be prepared.

A lactam, 5-acetyl-6,6-dimethyl-2-piperidone, has been isolated from the reaction of diacetone acrylamide with anionic catalysts. It is believed that this lactam may be an intermediate in the formation of polymers containing nylon-5 moieties by the above-described method. Likewise, such polymers may be prepared by the further reaction of 5-acetyl-6,6-dimethyl-2-piperidone with an anionic catalyst.

The preparation of the polymers of this invention from diacetone acrylamide is illustrated by the following examples.

Example 1

To a solution of 2.7 grams of naphthalene in 150 ml. of tetrahydrofuran is added 0.5 gram of sodium metal; the reaction is carried out in a nitrogen atmosphere. A solution of 50 grams of diacetone acrylamide in 150 ml. of tetrahydrofuran is purged with nitrogen and 10 ml. of the naphthylsodium solution is added, with stirring. The mixture is stirred at room temperature for one week, after which about 2 grams of acetic acid is added and the solution is poured into 1200 ml. of heptane. A yellow solid polymer precipitates from the heptane solution; this solid is dissolved in acetone and precipitated by addition to water, whereupon it again deposits as a viscous oil. The oil is dissolved in acetone and reprecipitated from benzene, whereupon it is obtained as a tan solid.

The acetone-water solution from which the heptane-insoluble material was precipitated is saturated with sodium chloride. A viscous oily polymer separates and is decanted; this oil is insoluble in benzene and soluble in acetone. An acetone solution thereof is poured into water and the oil thus obtained is dried at 50° C. in a vacuum oven. A brittle, light yellow solid is obtained.

Example 2

To a solution of 20 grams of diacetone acrylamide and 80 grams of acrylonitrile in 100 grams of tetrahydrofuran is added, at 25° C., an anionic polymerization catalyst formed by dissolving 2.3 grams of sodium metal and 12.8 grams of naphthalene in 30 grams of tetrahydrofuran. The mixture is allowed to warm to room temperature, whereupon an exothermic reaction occurs which causes the temperature to rise to 50° C. The precipitated polymer is filtered from the solution and purified by dissolving in dimethylformamide and reprecipitating by addition of methanol. There is thus obtained an anionic copolymer of diacetone acrylamide and acrylonitrile.

Example 3

To a solution of 84.5 grams of diacetone acrylamide in 100 ml. of dimethylformamide is added 0.2 gram of metallic sodium. The mixture is stirred at room temperature for 48 hours, after which 2 ml. of concentrated hydrochloric acid is added. The dimethylformamide solution is poured slowly into 750 ml. of water, with stirring. A viscous yellow oily polymer separates and solidifies to a brittle yellow solid. The aqueous solution, upon saturation with sodium chloride, deposits an oil which is dissolved in acetone and reprecipitated by addition of the acetone solution to benzene. After removal of the solvent in a vacuum oven at 50° C., there is obtained a brittle yellow solid polymer.

The aqueous solution is extracted with three 150-ml. portions of cloroform. Upon removal of the solvent, there is obtained a viscous yellow-brown liquid which is dried at 50° C. in a vacuum oven.

Example 4

A solution of 35.57 grams of diacetone acrylamide and 0.0481 gram of N-phenyl-2-naphthylamine in 94 ml. of benzene is purged with argon, and a solution of 6.8 ml. of butyllithium solution is added, with stirring. The mixture is stirred for 25 hours, after which a solution of 1.25 grams of sulfuric acid in 10 ml. of tetrahydrofuran is added. A solid polymer precipitates; it is removed by filtration, dried in a vacuum oven at 50° C., dissolved in 200 ml. of methanol and reprecipitated by the addition of methanol solution to ether.

The benzene solution is diluted with methanol and precipitated by pouring into refluxing textile spirits. The polymeric precipitate which is thus obtained is dried in a vacuum oven at 50° C.

Example 5

To a solution of 47 grams of diacetone acrylamide and 0.067 gram of N-phenyl-2-naphthylamine in 188 grams of tetrahydrofuran is added a solution of 4.7 ml. of 3 N phenylmagnesium bromide in ether. The reaction mixture is stirred under nitrogen for 68 hours at room temperature, after which time 10 ml. of a 1.5 M solution of hydrofluoric acid in tetrahydrofuran is added. Upon addition to 25 ml. of textile spirits at 60° C., a precipitate is obtained which is dried in a vacuum oven to yield a deep yellow, tacky polymer.

The nylon-7 polymers of this invention may also be prepared by a series of reactions starting with an N-3-oxohydrocarbon-substituted amide or a 3-oxoalkyl ester. In this series of reactions, the amide or ester is reacted with a suitable secondary amine to form the enamine of the oxo group, and this enamine is caused to undergo an addition reaction with acrylonitrile, an ester of acrylic acid or the like. The original acid group and the enamine moiety are then removed from the ester or amide by hydrolysis and the resulting oxo-(amino or hydroxy) ester, acid or nitrile undergoes self-condensation to form the desired polymer. The following sequences of reactions are illustrative.

I.

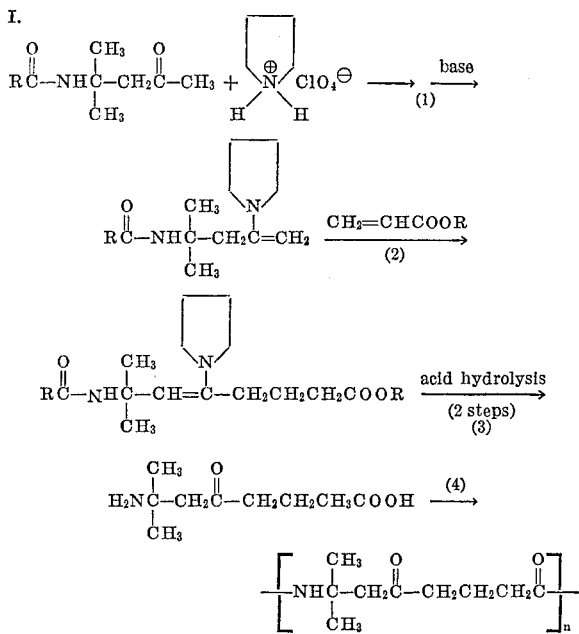

II

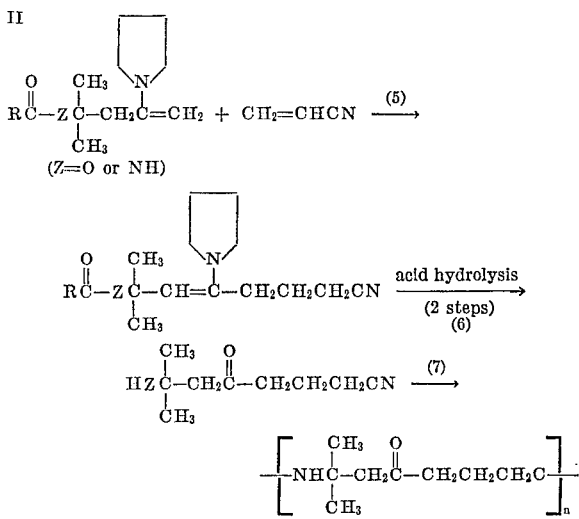

The starting materials for the above sequences may be prepared by methods well known to those skilled in the art. Thus, the amides may be prepared by reacting two moles of acetone, one mole of diacetone alcohol or one mole of mesityl oxide with one mole of acetonitrile in the presence of sulfuric acid. The analogous esters may be prepared by the reaction of mesityl oxide or diacetone alcohol with a carboxylic acid under esterification conditions.

The preparation of the enamine—reaction (1) in the above reaction sequence—is effect by reacting the ester or amine with a salt of a suitable secondary amine, preferably the perchlorate of pyrrolidine as indicated, usually in a relatively high-boiling solvent such as benzene or toluene under reflux conditions, and subsequently neutralizing the salt thus obtained with a base such as an alkali metal alkoxide. The enamine may then be reacted with a suitable unsaturated ester or nitrile—reaction (2) or (5)—usually under neutral conditions at a temperature of about 50–100° C., in a suitable solvent (preferably a polar solvent such as methanol or the like). This reaction is a variant of the so-called "Michael addition."

Acid hydrolysis of the Michael addition product, under relatively mild conditions, reconverts the enamine group to the oxo group. Further acid hydrolysis of the amide or ester thus formed converts it to an amino acid or an amino or hydroxy nitrile (reaction (3) or (6)). The amino acid may then be converted to a polyamide by ordinary condensation methods. The amino or hydroxy nitrile may undergo self-condensation under the conditions of the "Ritter reaction" in the presence of sulfuric acid. The product in either case is the polymer of this invention with a nylon-7 structure.

The uses of the polymers of this invention are similar to the uses of other known polyamides. Thus, they may be used for the preparation of fibers or for molding. They are also suitable for conversion into films.

Molding of the polymers of this invention is preferably effected by injection molding or extrusion techniques. The molded products are suitable for use in the manufacture of industrial and electrical parts, wire coatings and the like.

The lower molecular weight polyamides of this invention, which are soluble in alcohol and similar organic polar solvents, may be used for finishing textiles and paper and in special adhesive compositions.

The preparation of fibers from the polyamides of this invention is most conveniently accomplished by melt-spinning. The fibers thus obtained may be made suitable for textile applications by cold-drawing and subsequent annealing or heat-treating. The methods for carrying out these operations are well known and extended discussion of them herein is not believed necessary.

The polymers of this invention may be converted into films by dissolving in a suitable solvent and casting on a flat surface, by extrusion, or by other well-known methods.

What is claimed is:

1. A method for the preparation of a polymeric composition of matter comprising repeating units represented by at least one of the formulas

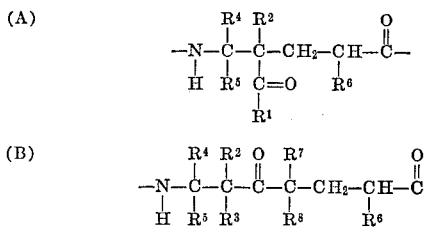

wherein each of $R^1$, $R^2$, $R^3$, $R^4$, $R^5$, $R^7$, and $R^8$ is individually hydrogen or a hydrocarbon radical and $R^6$ is hydrogen or a lower alkyl radical, which comprises dissolving an N-3-oxohydrocarbon-substituted acrylamide in a solvent which is inert to the catalyst at a temperature from room temperature to about 100° C. and adding an anionic catalyst.

2. A method according to claim 1 wherein the N-3- oxohydrocarbon-substituted acrylamide is N-(1,1-dimethyl-3-oxobutyl)acrylamide.

References Cited

UNITED STATES PATENTS 2,749,331 6/1956 Breslow _____ 260—89.7
3,277,056 10/1966 Coleman.

WILLIAM H. SHORT, Primary Examiner
L. L. LEE, Assistant Examiner

U.S. Cl. X.R.
260—65, 89.7